(12) United States Patent  (10) Patent No.: US 7,557,820 B2
Shiraishi  (45) Date of Patent: Jul. 7, 2009

(54) OPTICAL MULTI-BEAM SCANNING DEVICE AND IMAGE FORMING APPARATUS

(75) Inventor: Takashi Shiraishi, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 150 days.

(21) Appl. No.: 11/080,622

(22) Filed: Mar. 16, 2005

(65) Prior Publication Data

US 2006/0209168 A1    Sep. 21, 2006

(51) Int. Cl.
*B41J 15/14* (2006.01)
*B41J 27/00* (2006.01)
(52) U.S. Cl. ...................... 347/241; 347/256
(58) Field of Classification Search .......... 347/241, 347/232, 233, 256
See application file for complete search history.

(56) References Cited

U.S. PATENT DOCUMENTS

| | | | | |
|---|---|---|---|---|
| 4,760,407 | A * | 7/1988 | Arimoto et al. | 347/241 |
| 4,796,961 | A * | 1/1989 | Yamada et al. | 359/218 |
| 5,009,472 | A * | 4/1991 | Morimoto | 359/206 |
| 5,048,030 | A * | 9/1991 | Hiiro | 372/68 |
| 5,179,462 | A * | 1/1993 | Kageyama et al. | 359/204 |
| 5,404,365 | A * | 4/1995 | Hiiro | 372/27 |
| 6,381,078 | B1 | 4/2002 | Yamaguchi et al. | |
| 6,847,389 | B2 | 1/2005 | Shiraishi | |
| 6,873,445 | B2 * | 3/2005 | Shiraishi | 359/204 |
| 6,963,433 | B2 * | 11/2005 | Yamawaki | 359/204 |
| 2002/0136149 | A1 * | 9/2002 | Horie | 369/112.27 |
| 2003/0112323 | A1 * | 6/2003 | Shirota et al. | 347/246 |
| 2004/0183890 | A1 * | 9/2004 | Sakamoto et al. | 347/233 |
| 2005/0168563 | A1 * | 8/2005 | Shiraishi | 347/225 |

FOREIGN PATENT DOCUMENTS

| JP | 10-221618 A | 8/1998 |
|---|---|---|
| JP | 11-218699 A | 8/1999 |
| JP | 2000-35546 A | 2/2000 |

OTHER PUBLICATIONS

U.S. Appl. No. 11/048,768, filed Feb. 3, 2005, Shiraishi.

* cited by examiner

*Primary Examiner*—Hai C Pham
(74) *Attorney, Agent, or Firm*—Foley & Lardner LLP

(57) ABSTRACT

The present invention can be adapted to improve optical efficiency even when a light source is disposed without restricting a polarization direction or an orthogonal direction with respect to an optical axis of a light beam from the light source. A multi-beam optical scanning device of the present invention includes a single optical deflecting device, a pre-deflection optical system that allows light beams from a plurality of light sources to enter the optical deflecting device, and a post-deflection optical system that focuses each reflecting light beam from the optical deflecting device on a scanned surface of each light beam. The pre-deflection optical system includes a polarizing beam splitter that synthesizes optical paths of two light beams, and the first half-wave retardation plate and a second half-wave retardation plate that change a polarization direction with respect to each light beam on two incident surfaces of the polarizing beam splitter. In this case, it is preferable to include a half-wave retardation plate or a quarter-wave retardation plate that changes a polarization direction of each component light beam in a combined light beam from an emitting surface of the polarizing beam splitter.

6 Claims, 7 Drawing Sheets

212 POLARIZING BEAM SPLITTER 101a, 101b, 102: HALF-WAVE RETARDATION PLATE

OPTICAL MULTI-BEAM SCANNING DEVICE AND IMAGE FORMING APPARATUS

BACKGROUND OF THE INVENTION

1. Field of the Invention

The present invention relates to an image forming apparatus such as a laser printer, and a digital copying machine, and an optical multi-beam scanning device capable of being utilized for such an image forming apparatus.

2. Description of the Related Art

Conventionally, in a method for synthesizing a plurality of beam optical paths, polarization characteristic is utilized to prevent a decrease in optical efficiency as follows (see Japanese Patent Application Laid-Open No. 2000-035546).

When two beams are synthesized, one beam passes through a half-wave retardation plate having an angle of 45 degrees with respect to a polarization direction of an incident light in a major axis and the polarization directions of two beams are arranged to have an angle of 90 degrees each other. Then, the two beams are synthesized with a polarization beam splitter surface. The beams pass through a quarter-wave retardation plate which emits circularly polarized light so that transmittance does not differ at a time of passing through an optical system due to the difference of polarization directions between two beams.

However, a conventional method has a number of limitations at an angle around the beam moving direction of a semiconductor laser junction surface and at an installation angle of a polarizing beam splitter.

For example, an optical scanning device includes a first lens and a cylinder lens disposed between a deflector (polygon mirror) and the first lens. The first lens reduces a divergence angle of a beam or changes the beam to a parallel and moderate converging light beam so that a divergent light radiated from a semiconductor laser is substantially parallel light beam. The cylinder lens focuses the beam emitted from the first lens in a sub-scanning direction nearby the optical scanning device. The optical scanning device deflects the beam passing through the cylinder lens by a deflector, focuses the deflected beam on a scanned surface by an image formation optical system, and scans the focused image at a uniform rate. In this case, the reason why the beam is condensed on the deflector in the sub-scanning direction is that the image formation optical system arranges a reflection surface and the scanned surface of the deflector in conjugate relation, thereby preventing an unevenness of the beam position on the image surface in the sub-scanning direction due to a surface inclination of a deflection plane.

In the same image formation optical system, a beam diameter on the image surface (scanned surface) in a main scanning direction is inversely proportional to a beam diameter on the deflector in the main scanning direction. A beam diameter in the sub-scanning direction is proportional to a beam diameter on the deflector in the sub-scanning direction. A beam diameter on the deflector in the sub-scanning direction is inversely proportional to a beam diameter on the cylinder lens in the sub-scanning direction and proportional to the distance between the cylinder lens and the deflector. The beam diameter on the cylinder lens in the sub-scanning direction is proportional to a beam diameter on the deflector in the main scanning direction.

In this case, defining a polarization direction in a predetermined direction determines a direction of the semiconductor laser junction surface to define a radiation angle in the main and sub-scanning directions. Fixing the first lens position determines a beam diameter on the first lens in the main scanning direction from the beam diameter on the deflector in the main scanning direction so that a focal distance of the first lens is determined. Defining the above-mentioned values substantially determines a beam diameter on the cylinder lens in the sub-scanning direction as an emitted beam from the first lens is close to a parallel ray so that the cylinder lens position is determined from the beam diameter on the image surface in the sub-scanning direction.

Thus, in an image formation optical system, fixing a polarization direction and then a beam diameter on an image surface determines the cylinder lens position. This increases an implementation limitation.

On the other hand, when an LD array is used, an LD array junction surface angle is adjusted to make a beam pitch on a photoconductor in a predetermined distance. In this case, a polarization direction is at an arbitrary angle. In order to maintain high optical efficiency by a polarizing beam splitter, it is necessary to determine an angle of the polarizing beam splitter so that a beam from one LD array in a plurality of LD arrays is incident as a P wave or an S wave against a reflection surface of the polarizing beam splitter.

When the angle of the polarizing beam splitter is large against the sub-scanning direction, it is necessary to incline the beam which is incident on the polarizing beam splitter with respect to the sub-scanning direction. As a result, an optical unit tends to be large in thickness in the sub-scanning direction. For example, when a polarization direction is inclined by 45 degrees with respect to a main scanning direction, each element of an optical system is disposed on the straight line which is inclined by 45 degrees from a scanning plane until the beam reflected on the polarization beam splitter surface is incident on the polarizing beam splitter. As a result, an optical unit tends to be large in thickness in the sub-scanning direction.

SUMMARY OF THE INVENTION

It is an object of an aspect of the present invention is to provide a multi-beam optical scanning device capable of improving optical efficiency even when a light source is disposed without restricting a polarization direction or an orthogonal direction with respect to an optical axis of a light beam from a light source and an image forming apparatus using such a multi-beam optical scanning device.

An optical multi-beam scanning device of a first aspect of the present invention includes a single optical deflecting device; a pre-deflection optical system that allows light beams from a plurality of light sources to enter the optical deflecting device; and a post-deflection optical system that focuses each reflecting light beam from the optical deflecting device on a scanned surface of each light beam, wherein the pre-deflection optical system includes a polarizing beam splitter that synthesizes optical paths of two light beams, and first polarization direction changing means for changing a polarization direction to be provided as a P wave and an S wave on a polarization beam splitter surface with respect to each light beam on two incident surfaces of the polarizing beam splitter.

An optical multi-beam scanning device of a second aspect of the present invention includes a single optical deflecting device; a pre-deflection optical system that allows light beams from a plurality of light sources to enter the optical deflecting device; a post-deflection optical system that focuses each reflecting light beam from the optical deflecting device on a scanned surface of each light beam, wherein the pre-deflection optical system includes a polarizing beam splitter that synthesizes optical paths of two light beams, and a first half-wave retardation plate and a second half-wave retardation plate that change a polarization direction with respect to each light beam on two incident surfaces of the polarizing beam splitter.

The image forming apparatus of the present invention includes the multi-beam scanning device of the present invention.

DESCRIPTION OF THE EMBODIMENTS

An embodiment of a multi-beam optical scanning device and an image forming apparatus according to the present invention will be described below with reference to drawings.

(A) First Embodiment

A first embodiment of a multi-beam optical scanning device and an image forming apparatus according to the present invention will be explained. The multi-beam optical scanning device of the first embodiment is utilized in a two-beam optical scanning device and the image forming apparatus of the first embodiment is utilized in a monochrome image forming apparatus.

Figure 1:
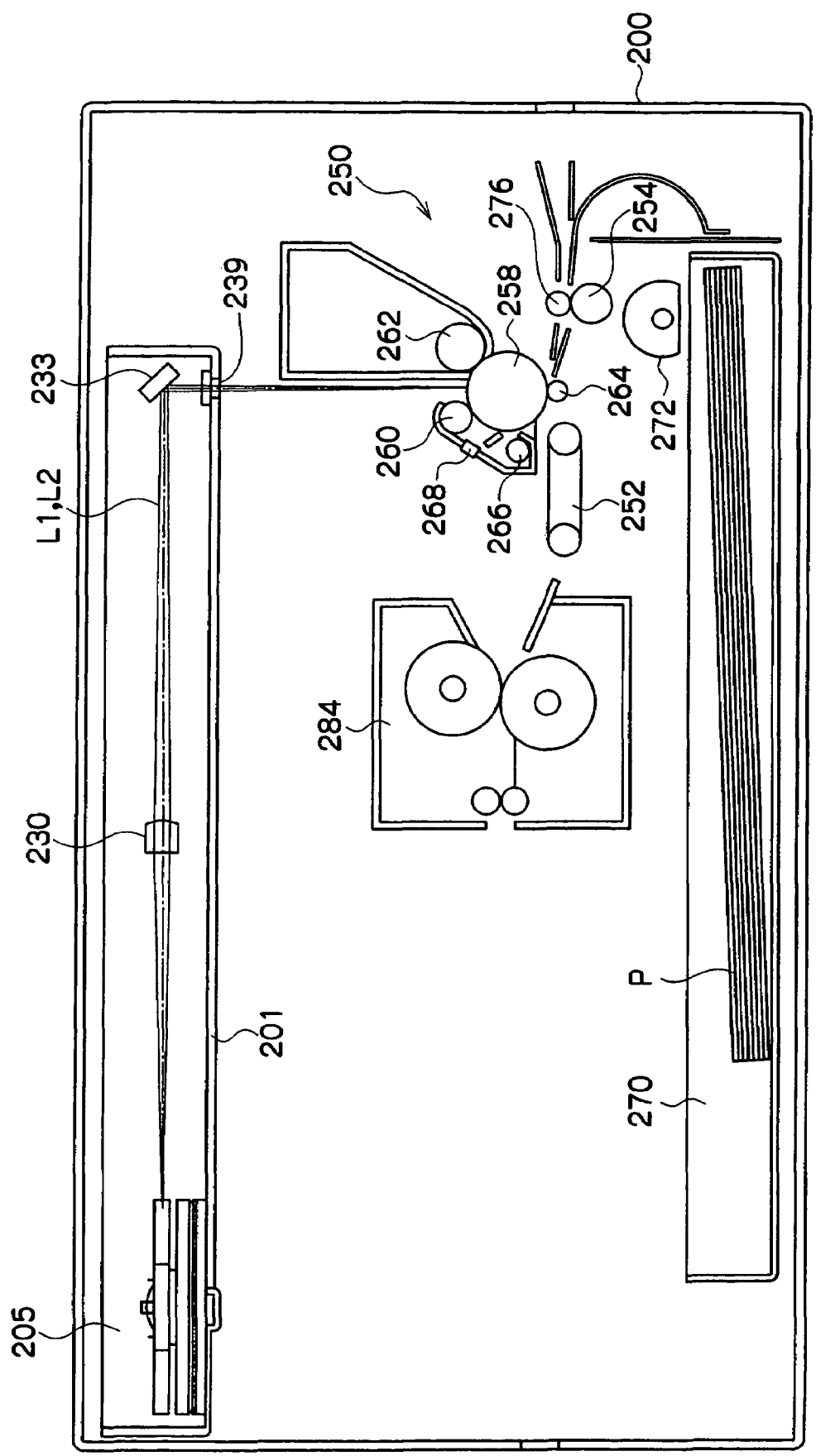
FIG. 1 is a schematic longitudinal sectional view of an image forming apparatus to which a two-beam optical scanning device according to a first embodiment is applied.

FIG. 1 shows the monochrome image forming apparatus in which the two-beam optical scanning device according to the first embodiment is utilized. FIG. 1 is a schematic longitudinal sectional view of the monochrome image forming apparatus.

In FIG. 1, an image forming apparatus 200 has an image forming unit 250 adopting the well-known laser beam printer method.

The image forming unit 250 is arranged at the position where laser beams L1 and L2 are output through a mirror 233 of a light-beam scanning device 201 which is described later.

The image forming unit 250 is formed in a cylindrical drum shape while can be rotated in a predetermined direction, and has a photoconductor drum 258 on which an electrostatic latent image corresponding to each image is formed. A charging device 260, a development device 262, a transfer device 264, a cleaner 266, and a charge removal device 268 are arranged around the photoconductor drum 258 in the order along the rotating direction of the photoconductor drum 258. The charging device 260 provides a predetermined potential to the surface of the photoconductor drum 258. The development device 262 performs the development by providing the color toner corresponding to the electrostatic latent image formed on the surface of the photoconductor drum 258. The transfer device 264 is opposed to the photoconductor drum 258 and the transfer device 264 transfers the toner image on the photoconductor drum 258 to the recording medium (recording paper P) conveyed through the conveyance belt 252. The cleaner 266 removes the toner remaining on the photoconductor drum 258 after the toner image is transferred through the transfer device 264. The charge removal device 268 removes the potential remaining on the photoconductor drum 258 after the toner image is transferred through the transfer device 264.

The laser beams L1 and L2 guided by the mirror 233 of the light-beam scanning device 201 are incident between the charging device 260 and the development device 262.

A paper cassette 270 is arranged below the photoconductor drum 258. The paper cassette 270 stores the recording paper P to which the image formed by the image forming unit 250 is transferred.

A substantially semilunar shaped paper feed roller 272 is arranged at one end of the paper. cassette 270 and on the side close to a roller 254 opposing to a registration roller 276. The paper feed roller 272 takes out the recording paper P stored in the paper cassette 270 one by one from a top of a stack of recording paper P. A registration roller 276 is arranged between the paper feed roller 272 and the photoconductor drum 258. The registration roller 276 aligns the front end of one piece of recording paper P taken out from the paper cassette 270 and the front end of the toner image formed on the photoconductor drum 258.

A fixing device 284 is arranged in the direction in which the recording paper P is conveyed. The image which is formed in the photoconductor drum 258 is transferred to the recording paper P by the transfer device 264. The fixing device 284 fixes the toner image transferred to the recording paper P onto the recording paper P.

Figure 2:
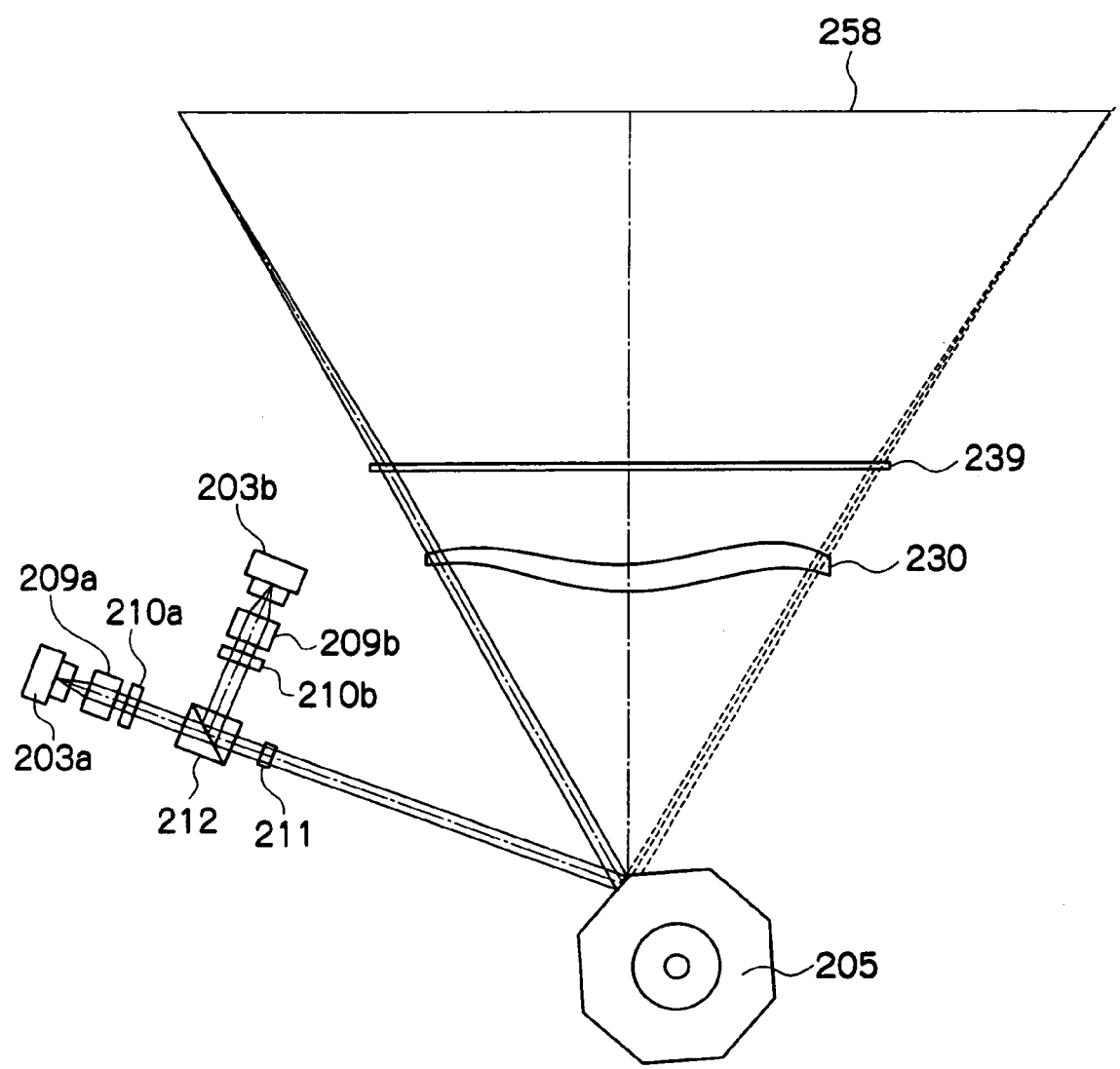
FIG. 2 is a schematic plan view showing an optical component position of the two-beam optical scanning device incorporated in the image forming apparatus of FIG. 1.

FIG. 2 shows the two-beam optical scanning device 201 which is utilized for the image forming apparatus 200 shown in FIG. 1. FIG. 2 is a schematic plan view showing a development of reflection by the mirror 233.

As shown in FIG. 2, the two-beam optical scanning device 201 has only one optical deflecting device 205 which is of the deflection means. The optical deflecting device 205 deflects the two laser beams emitted from first and second laser elements 203a and 203b as the light sources toward the predetermined position in the image surface (photoconductor drum 258) arranged at the predetermined position at predetermined linear velocity.

Only one image-formation lens 230 is arranged between the optical deflecting device 205 and the image surface. The image-formation lens 230 imparts predetermined optical characteristics to the first and second laser beams which are deflected toward the predetermined direction by the reflecting surface of the optical deflecting device 205. The mirror 233 (see FIG. 1) and a dust-proof glass 239 is arranged between the image-formation lens 230 and the image surface.

A pre-deflection optical system of the two-beam optical scanning device 201 has a group of light source 203 including the first and second laser elements 203a and 203b.

Between the first laser element 203a of the light source 203 and the optical deflecting device 205, a finite focus lens 209a, an aperture 210a, a polarizing beam splitter 212, and a hybrid cylindrical lens 211 are arranged as the pre-deflection optical system. A second laser 203b, a finite focus lens 209b, and an aperture 210b are arranged upstream of the incident surface different from the surface to which the laser beam L1 from the first laser 203a of the polarizing beam splitter 212 is incident. A hybrid cylindrical lens acting as a converging function in the sub-scanning direction is not limited to the hybrid cylindrical lens 211 shown in FIG. 2. The hybrid cylindrical lens may be provided on a separate light source one by one before the beam reaches the polarizing beam splitter 212.

Figure 3:
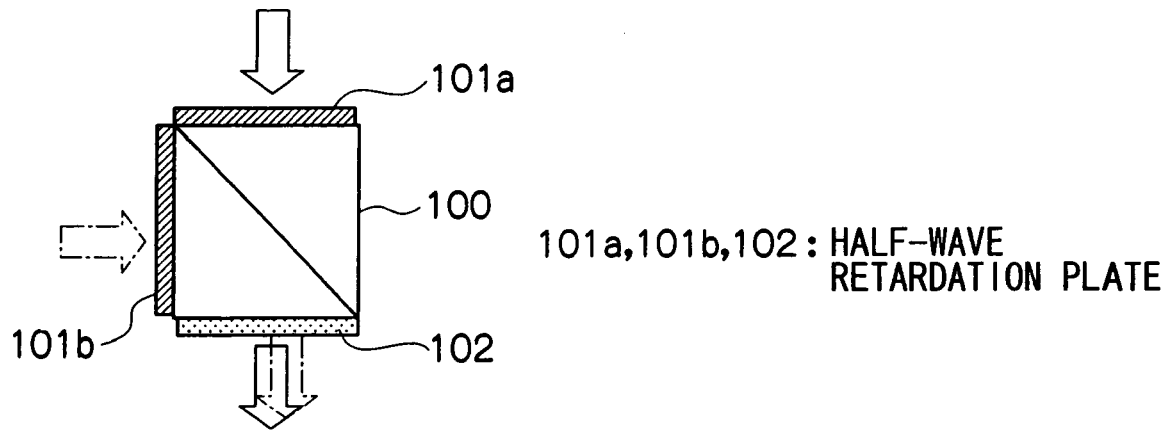
FIG. 3 is a schematic plan view showing a detail configuration of a polarizing beam splitter in FIG. 2.

FIG. 3 is a schematic plan view showing a detail configuration of the polarizing beam splitter 212.

In FIG. 3, the polarizing beam splitter 212 has a polarizing beam splitter body 100, a first half-wave retardation plate 101a, a second half-wave retardation plate 101b, and a third a half-wave retardation plate 102. The first half-wave retardation plate 101a is provided with the incident surface of the laser beam L1 from the first laser element 203a. The second half-wave retardation plate 101b is provided with the incident surface of the laser beam L2 from the second laser element 203b. The third half-wave retardation plate 102 is provided with an emitting surface.

The first half-wave retardation plate 101a, the second half-wave retardation plate 101b, and the third half-wave retardation plate 102 may be formed such that a half-wave retardation plate which is a discrete parts is adhered to the polarizing beam splitter body 100. Alternatively, the first half-wave retardation plate 101a, the second half-wave retardation plate 101b, and the third half-wave retardation plate 102 may be configured such that a multilayered dielectric film is formed on a corresponding surface of the polarizing beam splitter body 100 by vapor deposition or a coating process and the multilayered dielectric film functions as a half-wave retardation plate. The latter is also referred to as a "half-wave retardation plate" in the specification (the same applies to a "quarter-wave retardation plate" described later).

The above-mentioned first and second laser elements (laser diodes) 203a and 203b are inclined by a junction surface angle of 45 degrees from the main scanning direction. In this case, the first and second laser elements 203a and 203b are not limited to this angle. The absolute value of the junction surface inclination from the sub-scanning direction may have substantially the same angle with respect to the sub-scanning direction (the reason will be explained later).

Figure 4:
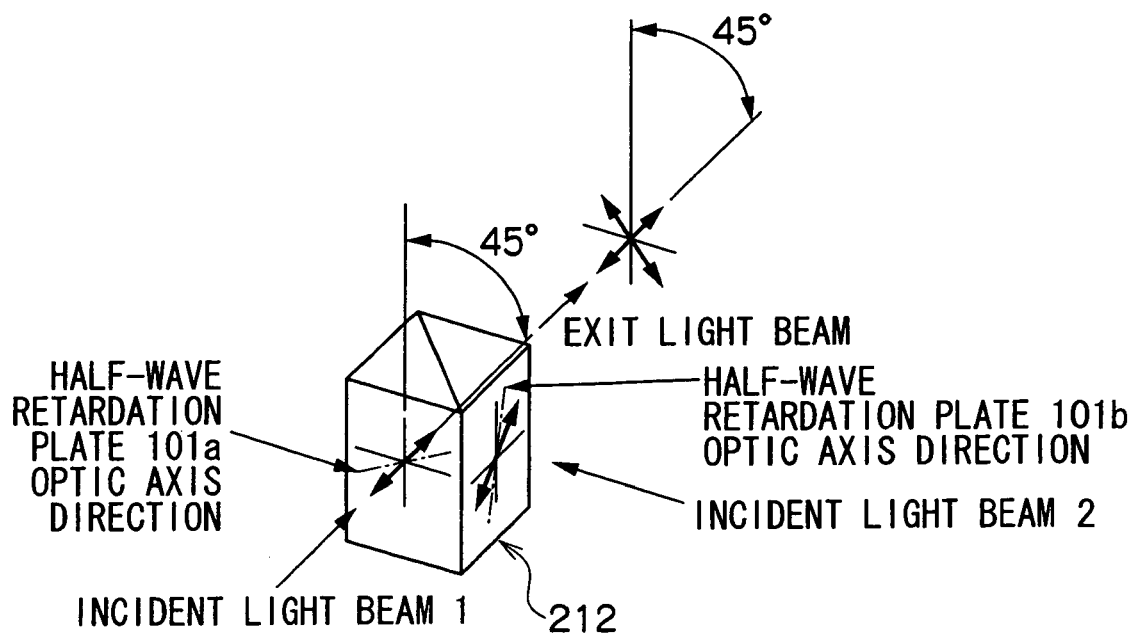
FIG. 4 is an explanatory diagram showing a polarization direction of incident and exit lights according to the polarizing beam splitter in FIG. 2.

As shown in FIG. 4, the first half-wave retardation plate 101a has its optic axis inclined by an angle of 22.5 degrees from the main scanning direction. The second half-wave retardation plate 101b has its optic axis inclined by an angle of 67.5 degrees from the main scanning direction. The third half-wave retardation plate 102 has its optic axis inclined by an angle of 22.5 degrees from the main scanning direction.

Therefore, in the polarizing beam splitter 212 according to the first embodiment, the laser beams L1 and L2 from the first and second laser elements 203a and 203b are respectively provided as a P wave and an S wave by passing the corresponding first half-wave retardation plate 101a or second half-wave retardation plate 101b to reach the polarization beam splitter surface. The laser beam combined by the polarization beam splitter surface passes through the third half-wave retardation plate 102 to be emitted in a state where a polarization direction is an angle of +/−45 degrees shown in FIG. 4. After passing through the hybrid cylindrical lens 211, the beam is incident on a deflector 205.

The reason for providing the half-wave retardation plates 101a and 101b on two incident surfaces of the polarizing beam splitter 212 is that optical efficiency is increased without restricting the direction of a laser junction surface around the optical axis of the first and second laser elements 203a and 203b. Further, the reason for providing the half-wave retardation plate 102 on the emitting surface of the polarizing beam splitter 212 is that the light amount difference between the two laser beams can be restrained at the time of polarization. The reason why the above-mentioned configuration is adopted will be explained.

In order to maximize transmittance and reflectance of the beam splitter surface of the polarizing beam splitter 212, it is necessary to provide the incident light to the beam splitter surface as a P wave or an S wave of a linearly polarized beam. As for one incident surface, the first half-wave retardation plate 101a is disposed such that the optic axis is positioned at an intermediate angle (not limited to the above-mentioned angle of 67.5 degrees) between the polarization direction provided as an S wave and the polarization direction of an incident light on the polarization beam splitter surface. As for the other incident surface, the second half-wave retardation plate 101b is disposed such that the optic axis is positioned at an intermediate angle (not limited to the above-mentioned angle of 22.5 degrees) between the polarization direction provided as a P wave and the polarization direction of an incident light on the polarization beam splitter surface.

Thus combined laser beam is separated into a P wave component and an S wave component with respect to the beam splitter surface. Except when the polarizing beam splitter 212 is inclined at an angle of 45 degrees around the optical axis, transmittance and light quantity distributions of each light beam in a post-deflection optical system are prone to differ.

Figure 5:
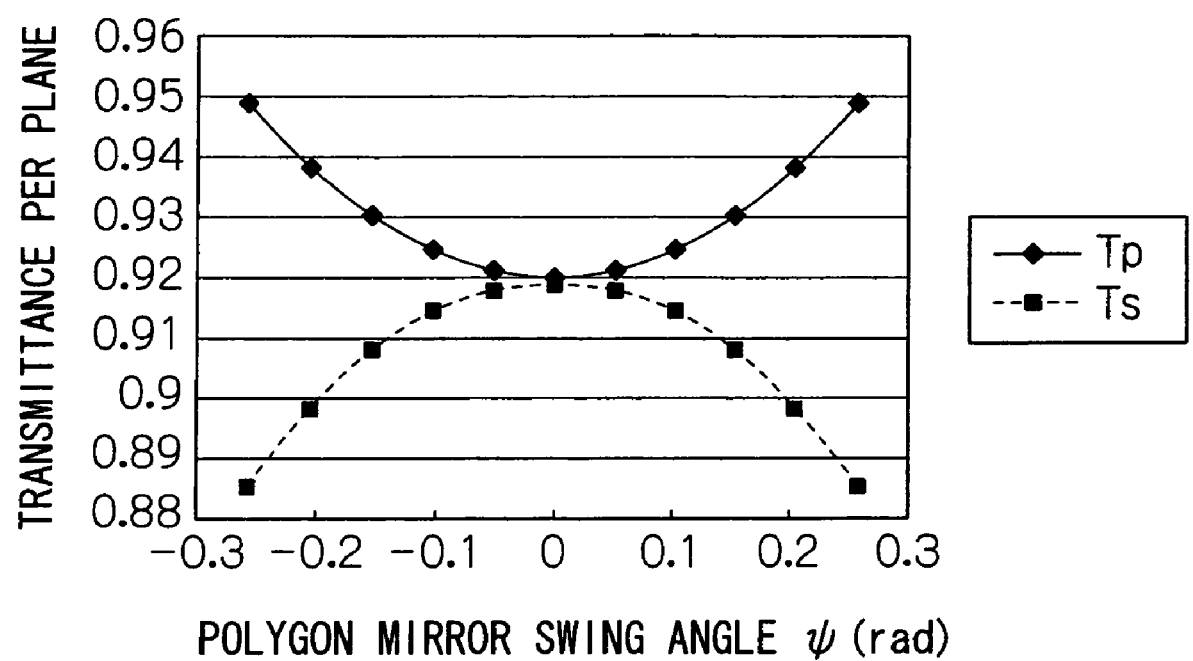
FIG. 5 is an explanatory diagram showing a relationship between a polygon mirror swing angle and transmittance of a P wave and an S wave per flat plate.

As shown in FIG. 5, this is because when the deflected laser beam is incident into the post-deflection optical system, the incident angle of the beam with respect to an optical component surface is increased into the post-deflection optical system as a deflection angle is increased. As a result, the angle dependence of the transmittance in a P wave and an S wave is different.

In order to avoid this problem, the third half-wave retardation plate 102 is disposed on the emitting surface of the polarizing beam splitter 212, the polarization direction is inclined by an angle of 45 degrees with respect to the main scanning direction, and the transmittance is set at an intermediate value between the P wave and the S wave. As shown in FIG. 5, in case that the polarization direction of the laser beam is inclined by 45 degrees, the transmittance becomes substantially an average value of a P wave and an S wave, thereby suppressing a fluctuation in transmittance.

Alternatively, instead of the third half-wave retardation plate 102 provided for suppressing the angle dependence of the transmittance in the P wave and the S wave, the quarter-wave retardation plate may be disposed on the emitting surface of the polarizing beam splitter 212 to emit a circularly polarized synthetic laser beam of circular polarization from the polarizing beam splitter 212. In a circularly polarized laser beam, the P wave component is substantially equal to the S wave component in an average, thereby suppressing the angle dependence of the transmittance in the P wave and the S wave.

In order to exhibit the function of the above-mentioned polarizing beam splitter 212 effectively, installation of the first and second laser elements (laser diodes) 203a and 203b also raises a problem. By providing the first half-wave retardation plates 101a and 101b, the polarization direction of an incident light on polarizing beam splitter 212 may have an arbitrary inclination. In case of a laser element, the beam divergence angle in the polarization direction is small in the parallel direction. Accordingly, in order to equalize optical characteristics such as a beam diameter, it is necessary to adjust the angle in the sub-scanning direction whose beam divergence angle is small. Therefore, the absolute value of the junction surface inclination of the laser element from the sub-scanning direction is set at substantially the same angle with respect to the sub-scanning direction.

According to the multi-beam optical scanning device and the image forming apparatus of the first embodiment, the two incident surface of the polarizing beam splitter are provided with half-wave retardation plates so that optical efficiency is increased without restricting the direction of a connected portion with respect to the optical axis of the laser beam element. Further, disposing a half-wave retardation plate or a quarter-wave retardation plate on the emitting surface of the polarizing beam splitter can restrain the light amount irregularity between two laser beams at the time of polarization.

(B) Second Embodiment

A second embodiment of the multi-beam optical scanning device and the image forming apparatus of the present invention will be described below. The multi-beam optical scanning device of the second embodiment is utilized in a four-beam optical scanning device and the image forming apparatus of the second embodiment is utilized in a color image forming device.

Figure 6:
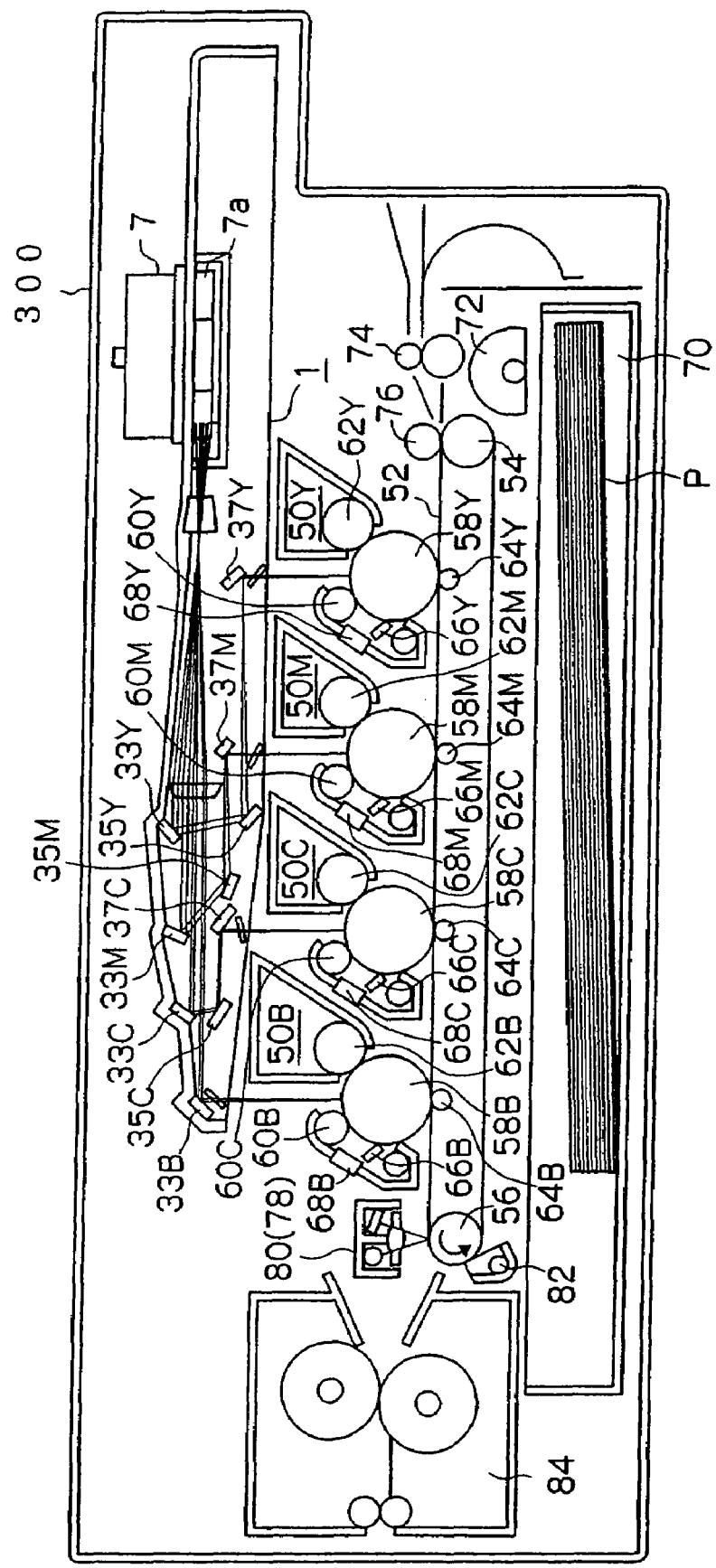
FIG. 6 is a schematic longitudinal sectional view of an image forming apparatus to which a four-beam optical scanning device according to the second embodiment is applied.

FIG. 6 shows the color image forming apparatus in which the four-beam optical scanning device according to the second embodiment is utilized. FIG. 6 is a schematic vertical cross-sectional view showing the configuration of the color image forming apparatus according to the second embodiment.

In this kind of color image forming apparatus, since there is generally employed four kinds of image data separated into each of colors including yellow (Y), magenta (M), cyan (C) and black (B) and four sets of various apparatuses for forming the image at each of the color components corresponding to each of Y, M, C and B, structure is made such as to identify the image data at each of the color components and the corresponding mechanism by adding Y, M, C and B to each of reference numerals.

As shown in FIG. 6, an image forming apparatus 300 includes first to fourth image forming units 50Y, 50M, 50C, and 50B for forming the image at each of the separated color components.

The respective image forming units 50 (Y, M, C, and B) are arranged in the order of 50Y, 50M, 50C and 50B below an optical scanning device 1 corresponding to each position at which laser beams L (Y, M, C, and B) are emitted for optical-scanning image information of each of the color components by a first mirror 33B and third mirrors 37Y, 37M, and 37C of a multi-beam optical scanning device 1 as described in detail with reference to FIGS. 7 and 8.

A transfer belt 52 for transferring transfer material on which an image formed through the respective image forming units 50 (Y, M, C, and B) are transferred is placed below the respective image forming units 50 (Y, M, C, and B).

The transfer belt 52 is passed over a. belt drive roller 56 and a tension roller 54 rotated by a motor (not shown) in the direction of the arrow and is rotated at a predetermined speed in a direction of rotation of the belt drive roller 56.

The respective image forming units 50 (Y, M, C, and B), cylindrically formed so as to be rotatable in the direction of the arrow, have photoconductor drums 58Y, 58M, 58C, and 58B on which an electrostatic latent image is formed correspond to an image exposed by the optical scanning device 1.

In the space surrounding each of the photoconductor drums 58 (Y, M, C, and B), along the rotational direction of respective photoconductor drums 58 (Y, M, C, and B), there are arranged charging devices 60 (Y, M, C, and B), developing devices 62 (Y, M, C, and B), transfer devices 64 (Y, M, C, and B), cleaners 66 (Y, M, C, and B), and discharging devices 68 (Y, M, C, and B). The changing devices 60 supply a predetermined potential on the surface of the respective photoconductor drums 58 (Y, M, C, and B). The developing devices 62 perform development by supplying toner having a color corresponding to an electrostatic latent image formed on the surface of the respective photoconductor drums 58 (Y, M, C, and B). The transfer devices 64, provided at a position opposed to the respective photoconductor drums 58 (Y, M, C, and B) from the back of the transfer belt 52 with the transfer belt 52 interposed between the respective photoconductor drums 58 (Y, M, C, and B), transfer toner image of the respective photoconductor drums 58 (Y, M, C, and B) to a recording medium transferred by the transfer belt 52, that is, a paper sheet P. The cleaner 66 removes residual toner remaining on the respective photoconductor drums 58 (Y, M, C, and B) when the respective transfer devices 64 (Y, M, C, and B) transfer toner image onto the sheet P. The discharging devices 68 discharge residual potential remaining on the respective photoconductor drums 58 (Y, M, C, and B) after transfer of toner image by the respective transfer devices 64 (Y, M, C, and B).

Below the transfer belt 52, there is disposed a sheet cassette 70 for receiving the sheet P on which the image formed by the respective image forming units 50 (Y, M, C, and B) is transferred.

A generally semilunar shaped conveying roller 72 for taking out the sheet P received in the sheet cassette 70 one by one from the top is disposed at one end of the sheet cassette 70 and on the side close to the tension roller 54.

A registration roller 74 for aligning one end of a paper sheet P taken from the cassette 70 with one end of a toner image formed to the photoconductor drum 58B of the image forming unit 50B (black) is disposed between the conveying roller 72 and the tension roller 54.

An adsorption roller 76 for providing a predetermined electrostatic adsorption force to a paper sheet P transferred at a predetermined timing by the registration roller 74 is arranged to a position close to the tension roller 54 between the registration roller 74 and the first image forming unit 50Y and a position opposed to the circumference of the transfer belt 52 corresponding to the position at which the tension roller 54 substantially comes in contact with the transfer belt 52.

At one end of the transfer belt 52 and close to the belt drive roller 56, and on the circumference of the transfer belt 52 substantially coming into contact with the belt drive roller 56, there are arranged registration sensors 78 and 80 for detecting the position of an image formed on the transfer belt 52 or transferred on the sheet P in the axial direction of the belt drive roller 56 at regular intervals. (FIG. 6 is a front cross-sectional view of the color image forming apparatus so that the registration sensors 78 located in front of a sheet surface are not shown in FIG. 6.)

A transfer belt cleaner 82 for removing toner or the sheet P residues deposited on the transfer belt 52 is disposed at a position on the circumference of the transfer belt 52 coming into contact with the belt drive roller 56 and at a position not coming in contact with the sheet P transferred by the transfer belt 52.

A fixing device 84 for fixing toner image transferred on the sheet P on the sheet P is disposed in the direction that the sheet P transferred through the transfer belt 52 is separated away from the belt drive roller 56 and further transferred.

Figure 7:
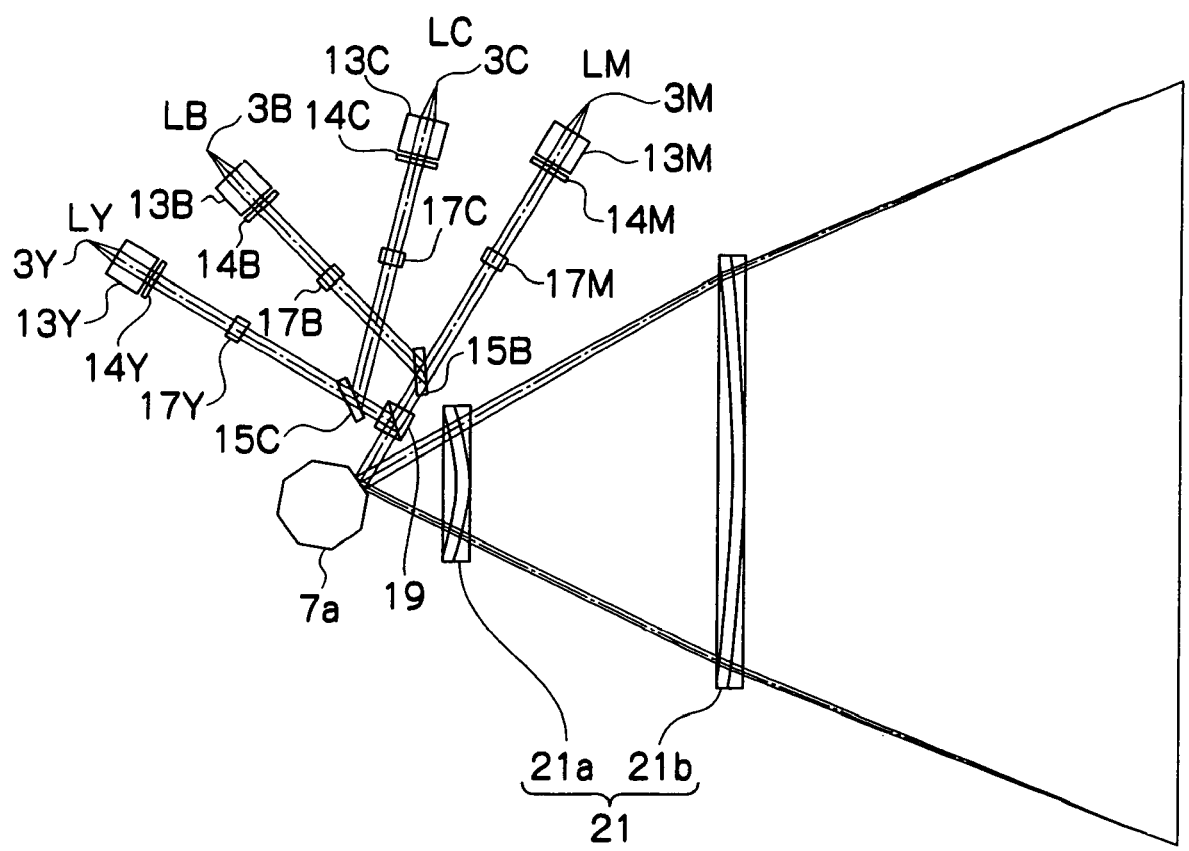
FIG. 7 is a schematic plan view showing an optical component position of the four-beam optical scanning device incorporated into the image forming apparatus of FIG. 6.

FIG. 7 illustrates the multi-beam optical scanning device (four-beam optical scanning device) 1 incorporated in the image forming apparatus shown in FIG. 6. As to the post-deflection optical system, a reflection by means of the mirror is developed.

The multi-beam optical scanning device 1 has light sources 3Y, 3M, 3C, and 3B for emitting a light beam toward the first to fourth of the respective image forming units 50Y, 50M, 50C and 50B shown in FIG. 6 and only one optical deflecting device 7 as deflecting means for deflecting (scanning) a light beam (laser beam) emitted by the respective light sources 3 (Y, M, C, and B) at a predetermined linear speed toward an image surface disposed in a predetermined position, that is, a circumference surface of the photoconductor drums 58Y, 58M, 58C, and 58B of the first to fourth of the respective image forming units 50Y, 50M, 50C and 50B shown in FIG. 6. Pre-deflection optical systems 5 (Y, M, C, and B) are disposed between the optical deflecting device 7 and the respective light sources 3 (Y, M, C, and B), and a post-deflection optical system is disposed between the optical deflecting device 7 and the image surface.

As shown in FIG. 7, the pre-deflection optical systems 5 include the respective light sources 3 (Y, M, C, and B) for each of color components constituted by a semiconductor laser element, finite focus lenses 13 (Y, M, C, and B) for providing a predetermined convergence to a laser beam emitted from the respective light sources 3(Y, M, C, and B), stops 14 (Y, M, C, and B) for providing a cross-sectional shape to the laser beam L passed through the finite focus lenses 13 (Y, M, C, and B), and cylinder lenses 17 (Y, M, C, and B) for further providing a predetermined convergence to the laser beam passed through the stops 14 (Y, M, C, and B) in the sub scanning direction. The pre-deflection optical systems 5 adjust the cross-sectional shape of the laser beam emitted from the respective light sources 3 (Y, M, C, and B) into a predetermined shape and guide the beam to a reflection surface of the optical deflecting device 7.

Figure 8:
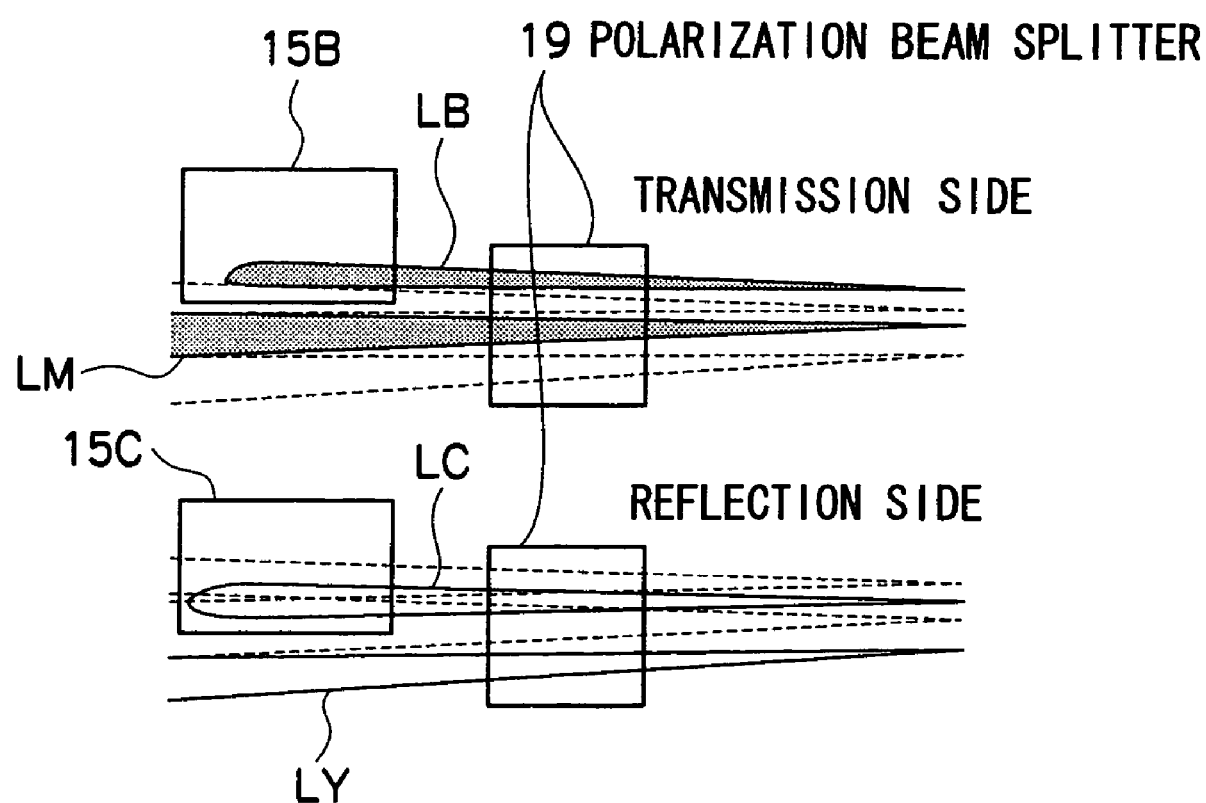
FIG. 8 is an explanatory diagram showing a propagating direction of a laser beam by an optical element in accordance with synthesization of an optical path in a pre-deflection optical system in FIG. 7.

FIG. 8 is an explanatory diagram showing a propagating direction of a laser beam by an optical element in accordance with synthesization of an optical path.

After a yellow laser beam LY emitted from a cylinder lens 17Y passes through below a mirror 15C, the yellow laser beam LY is reflected by a polarizing beam splitter 19 to be guided to the reflection surface of the optical deflecting device 7. A magenta laser beam LM emitted from a cylinder lens 17M passes through below a mirror 15B, and then straightly advances through the polarizing beam splitter 19 to be guided to the reflection surface of the optical deflecting device 7. A cyan laser beam LC emitted from a cylinder lens 17C has its optical path reflected by the mirror 15C, and then is reflected by the polarizing beam splitter 19 to be guided to the reflection surface of the optical deflecting device 7. A black laser beam LB emitted from a cylinder lens 17B has its optical path reflected by the mirror 15B and then straightly advances through the polarizing beam splitter 19 to be guided to the reflection surface of the optical deflecting device 7.

The optical deflecting device 7 has a polygonal mirror main body (polygon mirror) 7a, which has 8 surfaces of flat plane reflection surfaces (flat plane reflection mirrors) arranged in the shape of a regular polyhedron and a motor 7b which causes the polygonal mirror main body 7a to rotate in the main-scanning direction at a predetermined speed.

The post-deflection optical system 9 includes two sets of image forming lenses 21 (21a and 21b) and a plurality of mirrors 33Y, 35Y, and 37Y (yellow), 37M, 33C, 35C and 37C (cyan), and 33B (black) and the like. The image forming lenses 21 focus laser beams L (Y, M, C, and B) deflected (scanned) by the polygonal mirror body 7a on its image plane to optimize a shape and a position. The plurality of mirrors guide the laser beams L (Y, M, C, and B) for each of color components emitted from two sets of image forming lenses 21 to the corresponding photoconductor drums 58 (Y, M, C, and B).

In the second embodiment, a junction surface direction (that is, polarization direction) of the respective light sources 3(Y, M, C, and B) constituted by the semiconductor laser element are inclined at an angle of 45 degrees with respect to the main scanning direction. In this case, the junction surface direction is not limited to the above-mentioned angle, the absolute value of the junction surface inclination from the sub-scanning direction may has substantially the same angle with respect to the sub-scanning direction.

As shown in FIGS. 3 and 4, the polarizing beam splitter 19 of the pre-deflection optical systems 5 includes the half-wave retardation plates 101a and 101b on two incident surfaces and the half-wave retardation plate (or quarter-wave retardation plate) 102 on the emitting surface. The reason why the above-mentioned configuration is adopted is same as the first embodiment.

In the second embodiment, as mentioned above, the pre-deflection optical systems 5 include the two mirrors 15C and 15B. These mirrors 15c and 15B inserted between the light sources 3(Y, M, C, and B) and the polarizing beam splitter 19 have a multilayered dielectric film formed on the surface so that the difference of the phase change between a P wave and an S wave of an incident light and an exit light is 180 degrees (or its integral multiple). If the above-mentioned phase relationship is realized, other method may be used as surface treatment. In this case, even when the number of the mirror of the pre-deflection optical systems 5 is less than or more than the number of the mirror shown in FIG. 8, it is preferable that all mirrors are subjected to the above-mentioned surface treatment.

The mirrors 15C and 15B are subjected to surface treatment, which is because a linearly polarized beam from the light sources (semiconductor laser elements) 3 (Y, M, C, and B) is maintained to be entered into the polarizing beam splitter 19.

That is, when an incident light on the polarizing beam splitter 19 has a circularly polarized light component, transmittance and reflectance on the polarizing beam splitter 19 are decreased so that a linearly polarized beam is maintained after reflection by the mirrors 15C and 15B.

As a result, the polarization direction of an incident light may have an arbitrary inclination. In case of a semiconductor laser element, the beam divergence angle in the polarization direction is small in the parallel direction. Accordingly, in order to equalize optical characteristics such as a beam diameter, it is necessary to adjust the angle in the sub-scanning direction whose beam divergence angle is small.

In case of entering two laser beams (for example, LY and LC) into the same incident surface on the polarizing beam splitter 19, when the mirror (15C) is disposed at only one side between the light source (semiconductor laser element) and polarizing beam splitter 19, the mirror is set such that the difference of the phase change between a P wave and an S wave of an incident light and an exit light provides 180 degrees at the time of the same inclination angle of the semiconductor laser element. This equalizes the polarization direction of two laser beams into the incident surface on the polarizing beam splitter 19. In case of an angle opposite to the inclination angle of a laser beam element with respect to the sub-scanning direction, the mirror is set such that the difference of the phase change between a P wave and an S wave of an incident light and an exit light provides 0 degree. This equalizes the polarization direction of two laser beams of the incident surface on the polarizing beam splitter 19.

In the multi-beam optical scanning device and the image forming apparatus of the second embodiment, the two incident surfaces of the polarizing beam splitter are respectively provided with half-wave retardation plates so that optical efficiency is increased without restricting the direction of a connected portion with respect to the optical axis of a laser beam element.

Moreover, the mirror in the pre-deflection optical system is subjected to the surface treatment so that phase difference between a P wave and an S wave of an incident light and an exit light is 180 degrees or its integral multiple. Even when the mirror reflects the light beam, a linearly polarized beam can be maintained to exhibit the above-mentioned effect effectively.

Further, disposing a half-wave retardation plate or a quarter-wave retardation plate on the emitting surface of the polarizing beam splitter can restrain the light amount irregularity between four laser beams at the. time of polarization.

(C) Other Embodiments

While the invention is described in various modifications of embodiments in the explanation of the above-mentioned embodiments, other modifications of the embodiment can be described hereinbelow.

The present invention is widely applied to a multi-beam optical scanning device and an image forming apparatus having at least one polarizing beam splitter included in a pre-deflection optical system as an optical path combining member.

In the foregoing embodiments, a half-wave retardation plate for processing two incident lights to a polarizing beam splitter is disposed on the surface of the polarizing beam splitter. However, two half-wave retardation plate for processing two incident lights to the polarizing beam splitter by separated from the polarizing beam splitter may be disposed on the surface of the polarizing beam splitter. For example, when an optical scanning device has a cylinder lens located upstream in a polarizing beam splitter, a half-wave retardation plate for processing an incident lights to a polarizing beam splitter may be disposed at the flat surface side of an incident surface or an emitting surface of the cylinder lens.

Similarly, the half- or quarter-wave retardation plate disposed on the emitting surface of the above-mentioned polarizing beam splitter may be separated from the above-mentioned polarizing beam splitter.

In the foregoing embodiments, the half- or quarter-wave retardation plate is disposed on the emitting surface of the polarizing beam splitter. However, by omitting the wave retardation plate, the polarizing beam splitter may be rotated and disposed by 45 degrees around the optical axis so as to restrain the light amount irregularity.

What is claimed is:

1. A multi-beam optical scanning device, comprising:
a single optical deflecting device;
a plurality of photoconductor drums;
a pre-deflection optical system that allows light beams from a plurality of LD arrays which form electrostatic latent images on each photoconductor drum corresponding to each image for each of the LD arrays, to enter the optical deflecting device;
a post-deflection optical system that focuses each reflecting light beam from the optical deflecting device on a scanned surface of each light beam,
wherein the pre-deflection optical system includes a polarizing beam splitter that synthesizes optical paths of light beams from two LD arrays, whose height and incident angle in a sub-scanning direction on incident surfaces of the polarizing beam splitter are different, and polarization direction changing means for changing a polarization direction to be provided as a P wave and an S wave on a polarization beam splitter surface with respect to each light beam on two incident surfaces of the polarizing beam splitter,
wherein a polarization direction of the LD arrays inclines with respect to the P wave and the S wave on the polarization beam splitter surface,
wherein the plurality of LD arrays are disposed so that an absolute value of an inclination from a sub-scanning direction has the same angle in a polarization direction of the light beam from the plurality of LD arrays, the plurality of LD arrays emitting light beams whose light paths are combined by the polarizing beam splitter and wherein the polarization direction is at an angle not in the sub-scanning direction nor in a direction perpendicular thereto; and
at least one of a half-wave retardation plate and a quarter-wave retardation plate that change a polarization direction of each component light in a combined light beam from an emitting surface of the polarizing beam splitter of the pre-deflection optical system,
in case of the half-wave retardation plate, two beam polarization directions of the light beam are +/−45 degrees from the sub-scanning direction and the tilt directions are opposite, and
in case of the quarter-wave retardation plate, the rotation directions of the polarization are opposite at the optical deflecting device.

2. The multi-beam optical scanning device according to claim 1, wherein the pre-deflection optical system includes an optical path reflecting means for reflecting a light beam whose light path is combined by the polarizing beam splitter, the optical path reflecting means being treated so that a difference of a phase change between the P wave and the S wave of the incident light and the exit light is made an integer multiple of 180 degrees.

3. A multi-beam optical scanning device, comprising:
a single optical deflecting device;
a plurality of photo conductor drums;
a pre-deflection optical system that allows light beams from a plurality of LD arrays which form electrostatic latent images on each photoconductor drum corresponding to each image for each of the LD arrays, to enter the optical deflecting device;
a post-deflection optical system that focuses each reflecting light beam from the optical deflecting device on a scanned surface of each light beam,
wherein the pre-deflection optical system includes a polarizing beam splitter that synthesizes optical paths of light beams from two LD arrays, whose height and incident angle in a sub-scanning direction on incident surfaces of the polarizing beam splitter are different, and a first half-wave retardation plate and a second half-wave retardation plate that change a polarization direction to be provided as a P wave and an S wave on a polarization beam splitter surface with respect to each light beam on two incident surfaces of the polarizing beam splitter, wherein a polarization direction of the LD arrays inclines with respect to the P wave and the S wave on the polarization beam splitter surface, wherein the plurality of LD arrays that emit a light beam whose light path is combined by the polarizing beam splitter include a semiconductor laser element, the plurality of LD arrays being disposed so as to set an absolute value of a junction surface inclination of the semiconductor laser element from the sub-scanning direction to be the same angle and wherein the polarization direction is at an angle not in the sub-scanning direction nor in a direction perpendicular thereto; and at least one of a half-wave retardation plate and a quarter-wave retardation plate that change a polarization direction of each component light in a combined light beam from an emitting surface of the polarizing beam splitter of the pre-deflection optical system, in case of the half-wave retardation plate, two beam polarization directions of the light beam are +/−45 degrees from the sub-scanning direction and the tilt directions are opposite, and in case of the quarter-wave retardation plate, the rotation directions of the polarization are opposite at the optical deflecting device.

4. The multi-beam optical scanning device according to claim 3, wherein the pre-deflection optical system includes a mirror that reflects a light beam whose light path is combined by the polarizing beam splitter, and the mirror includes a multilayered dielectric film on a reflection surface so that a difference of a phase change between a P wave and an S wave of an incident light and an exit light is made an integer multiple of 180 degrees.

5. An image forming apparatus, comprising:
a multi-beam optical scanning device, including:
   a single optical deflecting device;
   a plurality of photoconductor drums;
   a pre-deflection optical system that allows light beams from a plurality of LD arrays which form electrostatic latent images on each photoconductor drum corresponding to each image for each of the LD arrays, to enter the optical deflecting device;
   a post-deflection optical system that focuses each reflecting light beam from the optical deflecting device on a scanned surface of each light beam,
   wherein the pre-deflection optical system includes a polarizing beam splitter that synthesizes optical paths of light beams from two LD arrays, whose height and incident angle in a sub-scanning direction on incident surfaces of the polarizing beam splitter are different, and polarization direction changing means for changing a polarization direction to be provided as a P wave and an S wave on a polarization beam splitter surface with respect to each light beam on two incident surfaces of the polarizing beam splitter,
   wherein a polarization direction of the LD arrays inclines with respect to the P wave and the S wave on the polarization beam splitter surface,
   the plurality of photoconductor drums each including a scanned surface on which a latent image is formed in accordance with the light beam from the multi-beam optical scanning device,
   wherein the plurality of LD arrays are disposed so that an absolute value of an inclination from a sub-scanning direction has the same angle in a polarization direction of the light beam from the plurality of LD arrays, the plurality of LD arrays emitting light beams whose light paths are combined by the polarizing beam splitter and wherein the polarization direction is at an angle not in the sub-scanning direction nor in a direction perpendicular thereto; and
   at least one of a half-wave retardation plate and a quarter-wave retardation plate that change a polarization direction of each component light in a combined light beam from an emitting surface of the polarizing beam splitter of the pre-deflection optical system,
   in case of the half-wave retardation plate, two beam polarization directions of the light beam are +/−45 degrees from the sub-scanning direction and the tilt directions are opposite, and
   in case of the quarter-wave retardation plate, the rotation directions of the polarization are opposite at the optical deflecting device.

6. An image forming apparatus, comprising:
a multi-beam optical scanning device, including:
   a single optical deflecting device;
   a plurality of photoconductor drums;
   a pre-deflection optical system that allows light beams from a plurality of LD arrays which form electrostatic latent images on each photoconductor drum corresponding to each image for each of the LD arrays, to enter the optical deflecting device;
   a post-deflection optical system that focuses each reflecting light beam from the optical deflecting device on a scanned surface of each light beam,
   wherein the pre-deflection optical system includes a polarizing beam splitter that synthesizes optical paths of light beams from two LD arrays, whose height and incident angle in a sub-scanning direction on incident surfaces of the polarizing beam splitter are different, and a first half-wave retardation plate and a second half-wave retardation plate that change a polarization direction to be provided as a P wave and an S wave on a polarization beam splitter surface with respect to each light beam on two incident surfaces of the polarizing beam splitter,
   wherein a polarization direction of the LD arrays inclines with respect to the P wave and the S wave on the polarization beam splitter surface,
   the plurality of photoconductor drums each including a scanned surface on which a latent image is formed in accordance with the light beam from the multi-beam optical scanning device,
   wherein the plurality of LD arrays are disposed so that an absolute value of an inclination from a sub-scanning direction has the same angle in a polarization direction of the light beam from the plurality of LD arrays, the plurality of LD arrays emitting light beams whose light paths are combined by the polarizing beam splitter and wherein the polarization direction is at an angle not in the sub-scanning direction nor in a direction perpendicular thereto; and
   at least one of a half-wave retardation plate and a quarter-wave retardation plate that change a polarization direction of each component light in a combined light beam from an emitting surface of the polarizing beam splitter of the pre-deflection optical system,
   in case of the half-wave retardation plate, two beam polarization directions of the light beam are +/−45 degrees from the sub-scanning direction and the tilt directions are opposite, and
   in case of the quarter-wave retardation plate, the rotation directions of the polarization are opposite at the optical deflecting device.

* * * * *